United States Patent [19]

Niblock et al.

[11] Patent Number: 4,638,432

[45] Date of Patent: Jan. 20, 1987

[54] APPARATUS FOR CONTROLLING THE TRANSFER OF INTERRUPT SIGNALS IN DATA PROCESSORS

[75] Inventors: John A. Niblock, Nuneaton; Jayant Patel, Coventry; Dennis Fisher, Tipton; Anthony P. Lumb, Nuneaton, all of England

[73] Assignee: The General Electric Company, p.l.c., England

[21] Appl. No.: 598,469

[22] Filed: Apr. 9, 1984

[30] Foreign Application Priority Data

Apr. 13, 1983 [GB] United Kingdom ............... 8310003

[51] Int. Cl.$^4$ ............ G06F 11/00; G06F 11/30; G06F 13/24
[52] U.S. Cl. .................................. 364/200; 371/7; 371/11; 371/13
[58] Field of Search ... 364/200 MS File, 900 MS File; 371/9, 11, 16, 22, 7, 13

[56] References Cited

U.S. PATENT DOCUMENTS

| 3,895,353 | 7/1975 | Dalton ........................... 364/200 |
| 3,908,099 | 9/1975 | Borbas et al. ............... 179/175.2 R |
| 4,371,754 | 2/1983 | De et al. ...................... 179/18 EE |
| 4,412,280 | 10/1983 | Murphy et al. ................ 364/200 |

FOREIGN PATENT DOCUMENTS 2032149 4/1980 United Kingdom ............ 371/9

OTHER PUBLICATIONS

J. L. Hufferd, Reliability in Multiprocessors Through Swapping Status of a Failing CPU Alternately with Status of a Non-Failing CPU; IBM Technical Disclosure Bulletin (vol. 14, No. 7, Dec. 1971), pp. 1968-1970.

Primary Examiner—Archie E. Williams, Jr.
Attorney, Agent, or Firm—Kirschstein, Kirschstein, Ottinger & Israel

[57] ABSTRACT

To ensure security of interrupt input signals to a computer system (30-3N) with minimum interruption of the running of programs in the system, two interrupt logic units (1) receive interrupt signals on leads (20-2x) from connected apparatus and store flags representing the interrupt signals in an interrupt store (2). Control logic (3) compares each input signal with presettable criteria to determine if such signal is an interrupt signal and, if so, causes the data to be transferred by way of a read register (5) to the connected computer system (30-3N). At the same time the control logic (3) of one of the units (1) designated as the active unit also causes an ouput on a lead (11) to the other unit (1) designated as the standby unit. If the standby unit determines that an immediate interrupt has occurred and does not receive a signal on the lead (11), its respective control logic (3) will cause the contents of its interrupt store (2) to be transferred to its respective read register (5) and will also cause an additional flag to be entered in the read register (5) indicating the failure of the active unit (1). Designation of the two units (1) as "active" or "standby" is periodically changed by action of the computer system (30-3N).

5 Claims, 7 Drawing Figures

APPARATUS FOR CONTROLLING THE TRANSFER OF INTERRUPT SIGNALS IN DATA PROCESSORS

BACKGROUND OF THE INVENTION

1. Field of the Invention

The present invention relates to input signal handling apparatus in particular to such apparatus for handling input signals to a computer and more particularly, but not exclusively, to apparatus for handling "interrupt" input signals.

2. Description of Related Art

It is common practice to provide arppartus connected to a computer with the ability to signal to the computer a change of its status which requires the running of a special program. Such signals presented to the computer are usually referred to as "interrupts". Such interrupts are graded according to their urgency and in particular may be categorised as "immediate"—that is requiring urgent attention—and "non-immediate"—that is requiring handling by a special program but not likely to result in a serious malfunction if the handling of it is delayed.

On receipt of an interrupt the computer hardware forces the computer software program currently running to be "nested" (stored in recoverable state) and causes an interrupt handling program to run to deal with the interrupt.

Such action may occur unnecessarily on numerous occasions if the number of non-immediate interrupts to be handled is high in comparison to the number of immediate interrupts. Such unnecessary actions impede the efficient running of the computer and, particularly when the computer is required to operate in real-time, reduce the loading which may be placed thereon.

In United Kingdom Pat. No. 1425173, The General Electric Company Limited (now The General Electric Company, p.l.c.) disclosed a method of handling immediate and non-immediate interrupts which reduced the number of occasions on which the computer was forced into running interrupt handling programmes and disclosed an interrupt signal handling apparatus for performing the method.

SUMMARY OF THE INVENTION

One object of the present invention is to provide input signal handling apparatus which is capable of pre-sorting interrupt signals and which has a higher level of security in comparison with the previously known system.

For the avoidance of doubt the term "immediate input signal" as used hereinafter means an input signal which requires urgent handling by a computer system. The term "non-immediate input signal" is an input signal which does not require urgent handling.

According to the present invention in input signal handling apparatus for controlling the transfer of input signals to a data processor, two input signal units are provided one of which is selected as an active unit and the other of which is selected as a monitoring unit, and each of which has a plurality of inputs arranged for connection to a respective source of input signals, an output for connection to a data processor, a data store which stores data defining a flag in respect of each signal received on one of said inputs and control means which compares each signal so received and stored with presettable criteria which determine whether the received signal is an immediate input signal (as hereinbefore defined) and, if so, the active input signal unit causes data defining all of the flags currently stored to be passed to its respective output and the subsequent erasure of the data defining those flags whereby all input signals received and stored as aforesaid are transferred to a connected computer and on occurence of an immediate input signal (as hereinbefore defined) the monitoring input signal unit monitors an output of the active input signal unit to determine whether that unit has acted to transfer data in the manner aforesaid and if so erases corresponding data in its respective data store and if not causes that data to be transferred to its respective output such that data defining an input signal to a connected data processor is not lost if one of the input signal units fails.

Preferably the selection of one of the units as active and the other as monitoring is reversed from time-to-time by action of a connected data processor.

Each unit of the apparatus may have a plurality of outputs each of which is arranged for connection to a respective one of a plurality of computers and the control means may be presettable to select to which of the outputs the data is passed.

According to a feature of the present invention in input signal handling apparatus for controlling the transfer of input signals to a data processor, an input signal unit has a plurality of inputs each arranged for connection to a respective source of input signals, an ouput of the unit is arranged for connection to a data processor, a first data store of the unit stores data defining a flag in respect of each signal received on one of said inputs and control means of the unit compares each signal so received and stored with presettable criteria which determine whether the received signal is an immediate input signal (as hereinbefore defined) and, if so, causes data defining all of the flags currently stored to be transferred from the first data store to a temporary data store and thence to the output, the data presented at the output by the temporary data store being looped back to inputs of the first data store to cause erasure of the data defining those flags which have been presented at the output such that only those flags representing received input signals whose occurrence has been successfully signalled to a connected data processor are erased.

BRIEF DESCRIPTION OF THE DRAWINGS

Input signal handling apparatus in accordance with the invention will now be described by way of example only with reference to the accompanying drawings of which.

DETAILED DESCRIPTION OF THE PREFERRED EMBODIMENT

Figure 1:
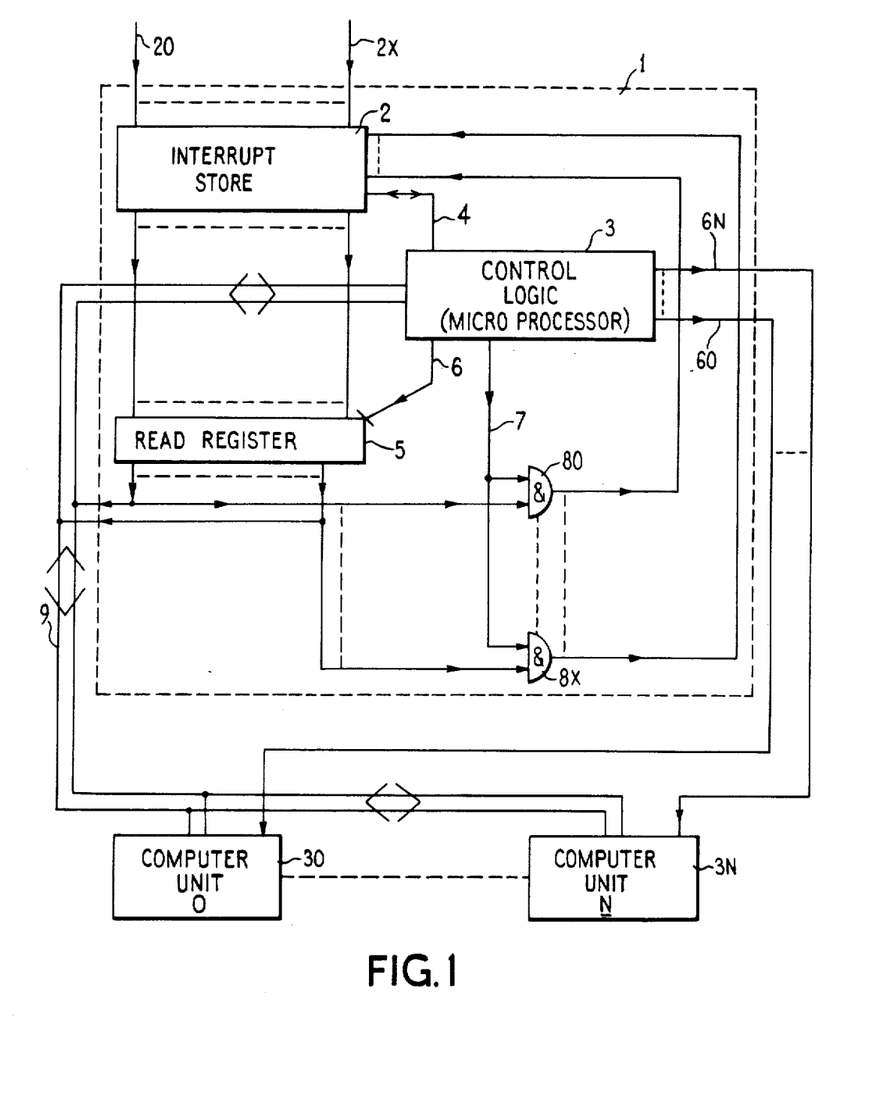
FIG. 1 is a block schematic diagram of one unit of the apparatus in use with multiple computers.

Referring to FIG. 1 the apparatus referred to hereinafter as an interrupt logic unit 1 handles interrupt signals generated by telephone exchange apparatus for example (not shown) which signals are received by way of a number of inputs 20 to 2x. The interrupt signals are stored by the interrupt logic unit 1 and forwarded to one of N computer units 30 to 3N either immediately (immediate interrupt) or subsequently (non-immediate interrupt).

To this end each interrupt received as a signal on one of the inputs 20 to 2x is latched in an interrupt store 2 and is passed to control logic 3 (which may be a microprocessor) by way of a data highway 4. The control logic 3 is arranged to be preprogrammed by the operating system of the multicomputer arrangement (30 to 3N) with data defining which interrupts are enabled and which of the interrupts should give rise to an immediate interruption of the software running in one of the computer units. The aforementioned operating system also designates which of the N computers will next handle interrupts.

Thus interrupts which are received by the interrupt logic 1 are latched into the interrupt store 2 and are compared by the control logic 3 with the above criteria. An interrupt which is not enabled as aforesaid is handled by the control logic 3 as a non-immediate interrupt. This facility permits unused ones of the inputs 20 to 2x to be left for future expansion, and unconnected, any such apparent interrupt signal being due possibly to "noise".

Some of the inputs 20 to 2x may also be programmed as not enabled when for example apparatus to which they are connected has been removed for servicing. However, if on comparison in the control logic 3 the particular interrupt is determined as enabled a further comparison is carried out to determine if the input is an immediate interrupt. If the interrupt is non-immediate no further action is taken by the control logic 3 for the time being.

If now a signal received on one of the inputs 20 to 2x is determined as being an immediate interrupt the control logic 3 forwards an immediate interrupt signal to the previously designated one of the computer units 30 to 3N on a respective one of the leads 60 to 6N.

On receipt of an interrupt signal the computer selected (say) 30 stops running its present program and calls an interrupt handling program. The interrupt handling program initiates a read function which causes data to be transferred from the interrupt store 2 to the read register 5 and latches the data in the read register 5 to prevent alteration of the data while the computer is performing the read which causes the contents of the register to be transferred over the data bus 9 which is an input/output bus of the computer system. On completion of the read function the data set in the interrupt store 2 is cleared.

It is here noted that if the number of interrupt inputs 20 to 2x is greater than the number of highways in the data bus 9 a number of read registers 5 may be provided and each may be addressed in turn by the interrupt handling program of the computer 30.

When the register 5 is read the signals therefrom pass by way of the AND gates 80 to 8x which are held enabled by the signal on the lead 7 from the control logic 3 and are fed back to the interrupt store 2 as latch resetting signals. Thus only those interrupt signals which have been successfully transferred are cancelled in the interrupt store 2, such signals arriving after latching of the read register 5 being retained for comparison in the control logic.

Once the interrupts have been transferred from the interrupt logic 1 the control logic disables the AND gates 80 to 8x and removes the latching signal received at the inputs 20 to 2x are now similarly handled.

In normal operation, once one of the computers 30 to 3N has been interrupted, the multicomputer operating system will access the control logic 3 by way of the data bus 9 and change the data which designates the computer to be interrupted.

As a further safeguard the control logic 3 may be arranged to commence a timeout once it has applied an interrupt signal on one of the leads 60 to 6N. If the read register 5 has not been addressed before expiry of the timeout then the control logic 3 is arranged to attempt to interrupt all of the computers 30 to 3N in turn until a response is received. It is here noted that the timeout may be pre-set in the control logic 3 by the operating system by way of the data bus 9. It should also be noted that if the timeout above expires the control logic 3 will generate interrupt data of its own into the interrupt store which the computer unit successfully interrupted will read as part of its read function and which will cause an indication of the failure if required.

Figure 2:
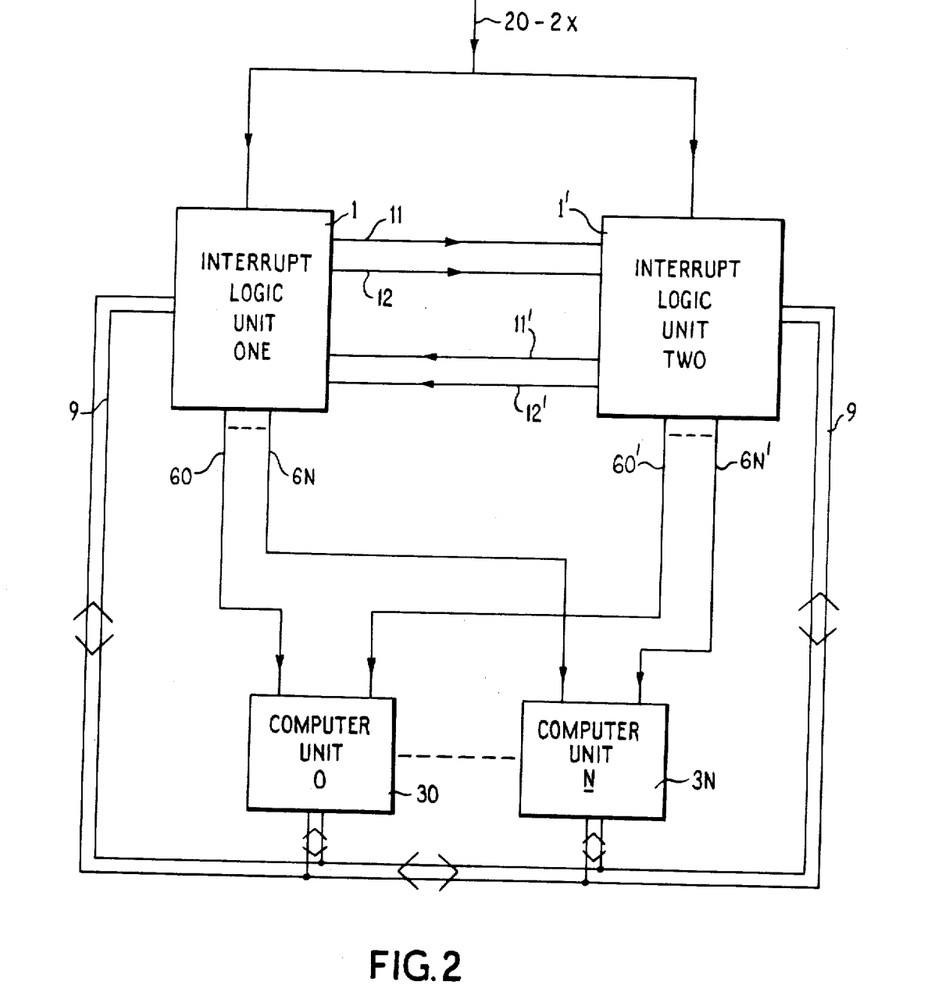
FIG. 2 is a connection diagram showing the interconnection of the two units of the apparatus to multiple computers.

Turning now to FIG. 2 for security purposes the interrupt logic unit 1 of FIG. 1 is duplicated, each of the logic units having the ability to interrupt any of the computer units 30 to 3N by way of respective interrupt leads 60 to 6N. For the purposes of description the interrupt logic unit on the left of FIG. 2 and its associated interrupts are designated as for FIG. 1 whilst their equivalents on the right of FIG. 2 are similarly designated with the addition of a prime (').

Each of the interrupt logic units 1 operates in an identical manner as far as determining the validity and status of an input signal received on one of the inputs 20 to 2x is concerned. In the case of FIG. 2 however one of the logic units, say, 1 is designated by the multi-computer operating system as the "working" unit whilst the other logic unit 1' is designated as the "stand-by" unit. It will be appreciated that the operating system may periodically interchange the designation of the two units.

The two logic units 1 are interconnected with two respective additional leads 11, 12 which are used in the following manner; when the working logic unit 1 generates an interrupt on one of the leads 60 to 6N it will forward a signal on the lead 11 and when the logic unit 1 detects that the read register (5 of FIG. 1) has been read it forwards a signal on the lead 12.

On receipt of an immediate interrupt the standby interrupt logic unit 1' commences a timeout and monitors the lead 11. This timeout may be preset by the operating system as previously described. The interrupt logic unit 1 having received the same immediate interrupt will proceed to pass a signal to one of the leads 60 to 6N and at the same time signals the lead 11.

The signal on the lead 11 is detected by the interrupt logic unit 1' which then cancels the timeout. The interrupt logic unit 1' now starts a further timeout and monitors the lead 12. When the interrupt logic unit 1 detects that the interrupted computer unit, say, 30 has read the interrupt data from the register 5 it forwards a signal on the lead 12 which is detected by the interrupt logic unit 1' which then cancels the second timeout thus commpleting the monitoring sequence.

If either of the timeouts expires without receipt of the respective signals on the leads 11 and 12, the interrupt logic unit 1' will generate an interrupt itself and will cause an additional interrupt flag indicating the failure of the "working" interrupt logic unit 1.

It is here noted that if whilst a first immediate interrupt and accummulated non-immediate interrupts are being transferred, a second immediate interrupt is received, the interrupt logic units 1, 1' will handle it on clearance of the read register. Thus if an immediate interrupt is received whilst the standby interrupt logic unit is monitoring the lead 12, the first monitoring timeout is also reset on detection of a signal on that lead.

The control logic 3 of the interrupt logic units 1 are arranged to receive a periodic 'refresh' signal by way of the data bus 9. This periodic refresh signal which should be provided by the multi-computer operating system is used to reset a timeout in the control logic 3. If such a signal is not received prior to the expiry of the timeout the control logic generates an immediate interrupt. The interrupt logic unit 1 may also be arranged to cause a hardware alarm system (not shown) to operate.

It will be appreciated that the designation of the interrupt logic units 1, 1' as "working" and "standby" respectively is periodically reversed by the multi-computer operating system to ensure that each is fully functional should one be required to act as the sole interrupt logic unit if the other is temporarily unavailable.

Figure 3:
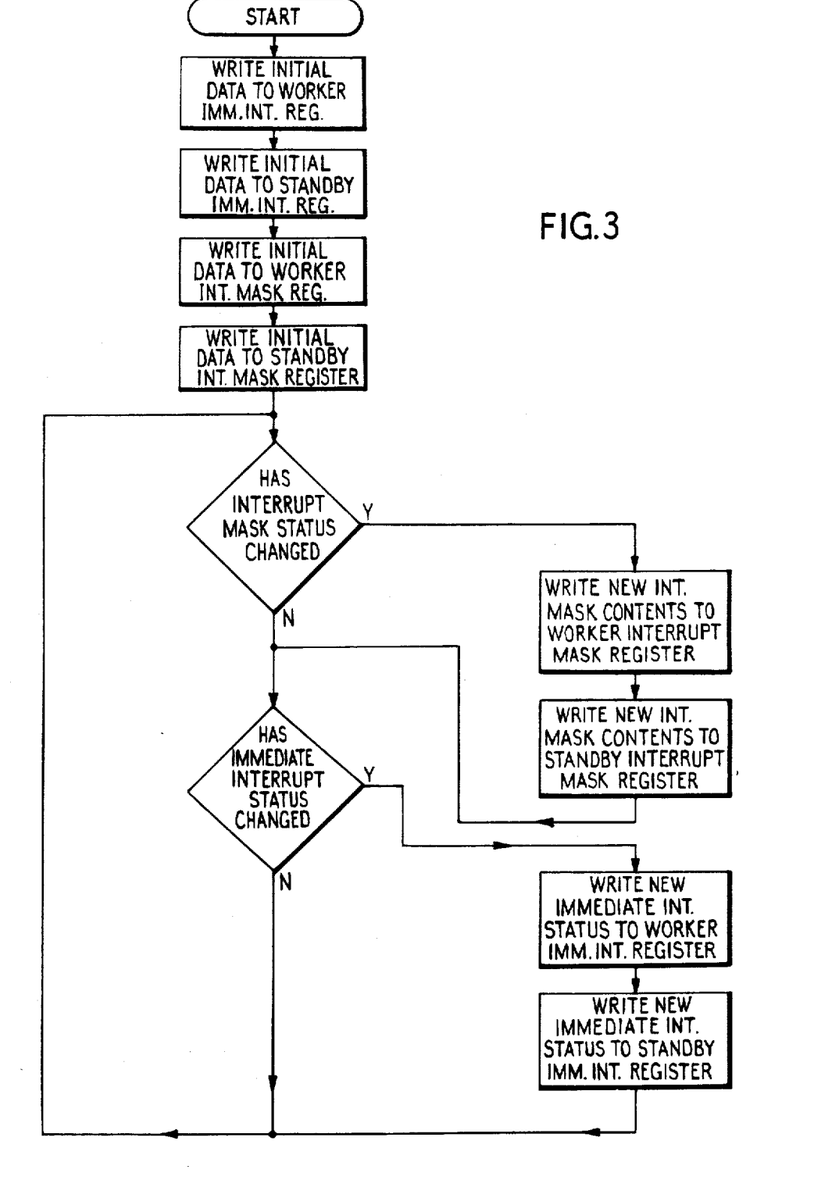
FIGS. 3 to 7 show logic flowcharts of programs which taken together provide for operation of the apparatus embodiment shown in FIGS. 1 and 2.

The abbreviations used on the flowcharts of FIGS. 3 to 7 are listed below:
IU—Interrupt Unit
PUS—Processor Utility Subsystem
H/W—Hardware
F/W—Firmware (Software in Programmable Read Only Memory on an Interrupt Unit)
S/W—Software (Software running on a Processor Utility Subsystem)
N—No
Y—Yes
IMM—Immediate
INT—Interrupt
REG—Register
LCPU—Lowest Priority Central Processor Unit
NO—Number
CPU—Central Processor Unit
WKR—Worker FIG. 3 shows the sequence for setting up immediate/masked (i.e. non-immediate) interrupt status information in the worker logic unit and the standby logic unit. This is the above-mentioned pre-programming by the operating system of the multicomputer arrangement (30 to 3N) of the control logic 3 of the logic units and is under control of the above listed PUS software.

Figure 4:
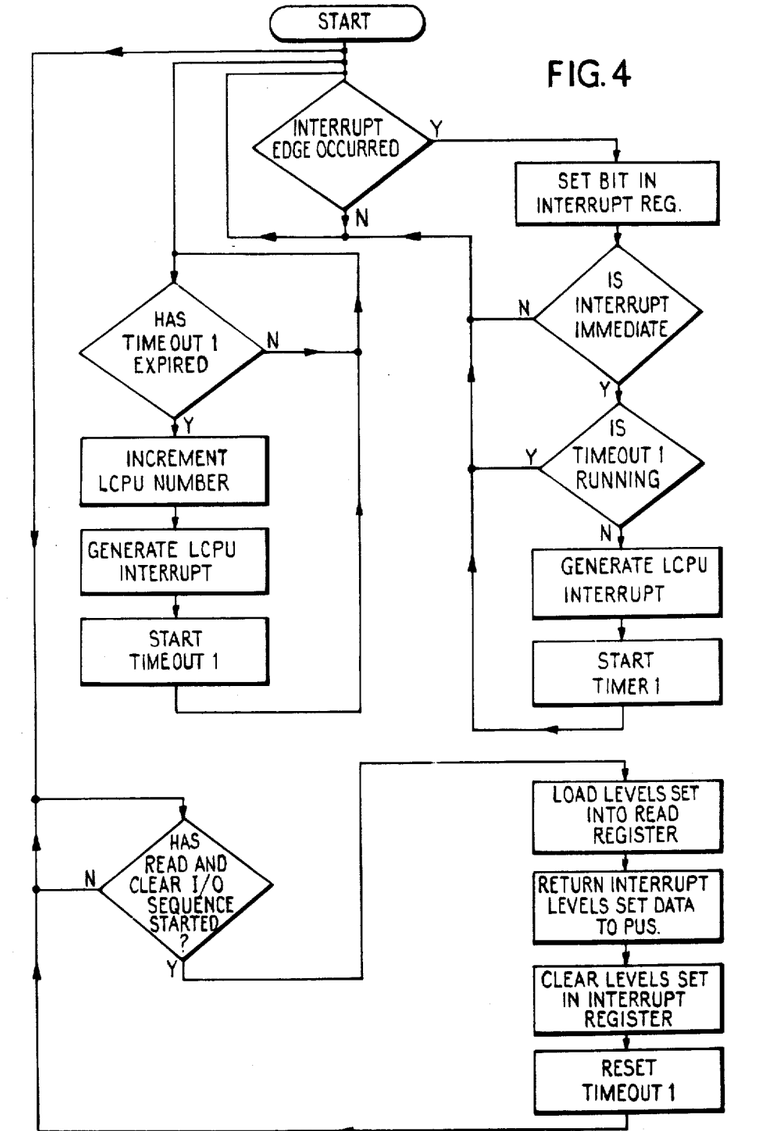

FIG. 4 shows the setting of immediate and non-immediate interrupts in the interrupt register 2, and the "read and clear" sequence for the interrupt register 2 and read register 5. These operations are performed by the interrupt unit (logic unit) hardware under control of the above-listed IU Firmware and PUS Software.

Figure 5:
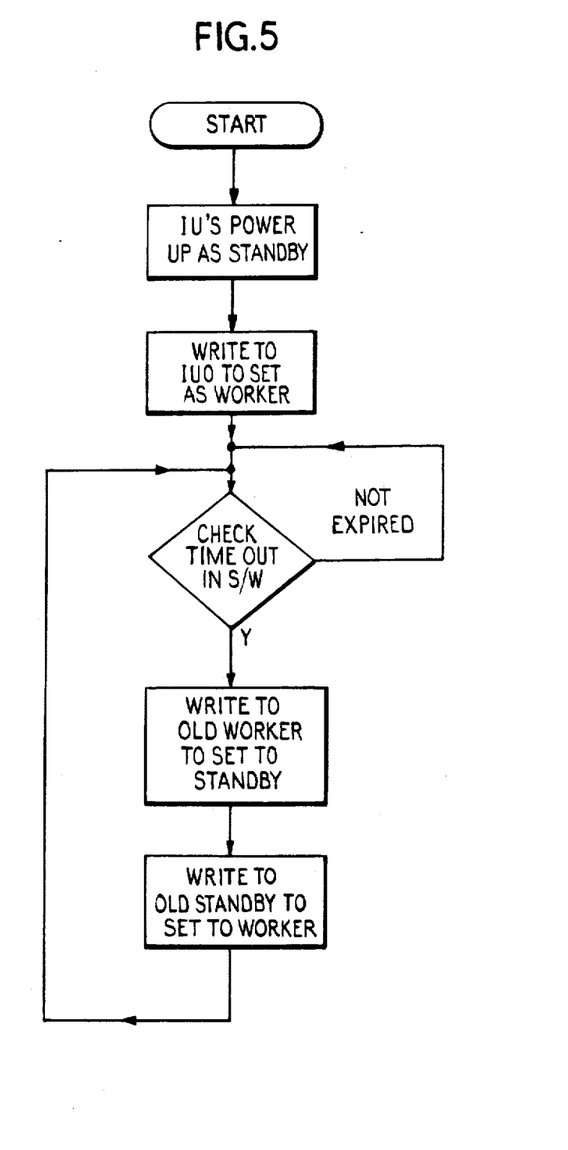

FIG. 5 shows the sequence for setting and changing over the worker/standby status of the logic units under control of the PUS Software.

Figure 6:
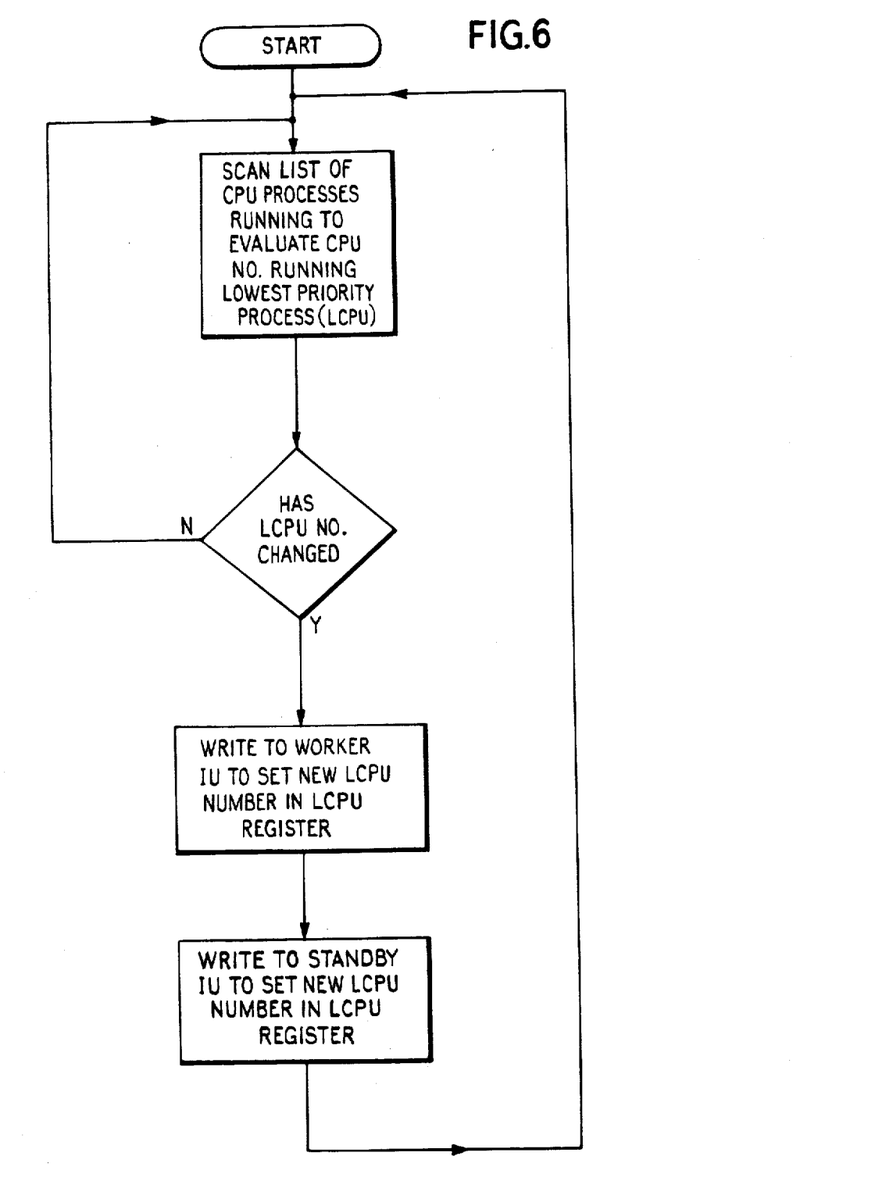

FIG. 6 shows the sequence for selecting the lowest priority CPU, i.e. which of the computers 30 to 3N will next handle interrupts, under control of the PUS Software.

Figure 7:
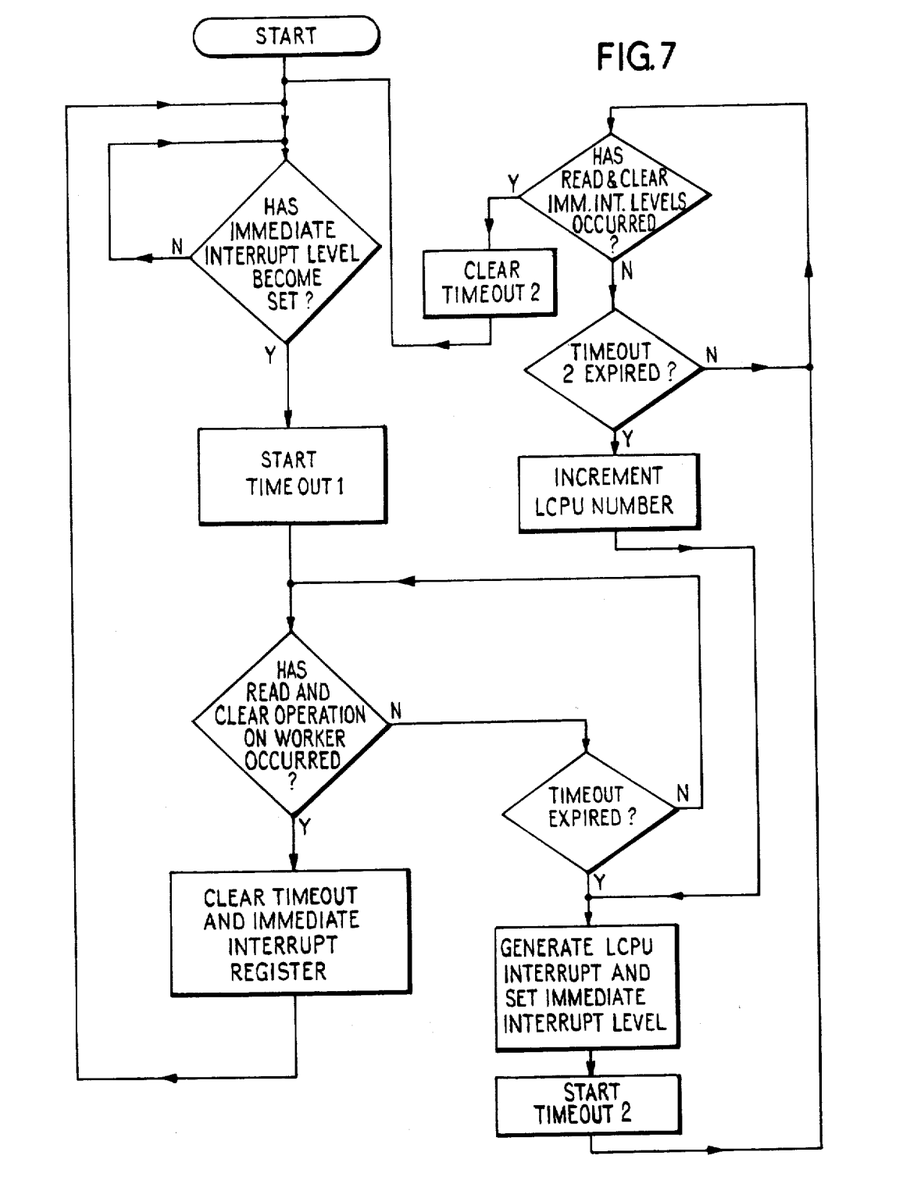

FIG. 7 shows the sequence for monitoring the worker logic unit by the standby logic unit. This is performed by the IU (logic unit) hardware and firmware in the standby logic unit.

What is claimed is:

1. Input signal handling apparatus for controlling the transfer of input signals to a data processor, wherein two input signal units are provided one of which is selected as an active unit and the other of which is selected as a monitoring unit, and each of which has a plurality of inputs each arranged for connection to a respective source of input signals, an output for connection to a data processor, a data store which stores each signal received on one of said inputs, and control means which compares each signal so received and stored with presettable criteria which determine whether the received signal is an immediate input signal and, if so, causes all said input signals currently stored in the active input signal unit to be passed to its respective output and the subsequent erasure of those input signals, whereby all input signals received and stored as aforesaid are transferred to a connected data processor, and wherein on occurrence of an immediate input signal, the monitoring input signal unit monitors an output of the active input signal unit to determine whether that unit has acted to transfer input signals in the manner aforesaid and, if so, erases corresponding input signals from its respective data store and, if not, causes those corresponding input signals to be transferred to its respective output such that the input signals for transfer to a connected data processor are not lost if one of the input signal units fails.

2. Input signal handling apparatus as claimed in claim 1 wherein the selection of one of the units as active and the other as monitoring is reversed from time-to-time by action of a connected data processor.

3. Input signal handling apparatus as claimed in claim 1 wherein each of said input signal units has a plurality of outputs each of which is arranged for connection to a respective one of a plurality of data processors, and the control means is presettable to select to which of the data processors the input signals are transferred.

4. Input signal handling apparatus as claimed in claim 1 wherein each input signal unit has a temporary data store interposed between said data store and said output, and the control means is arranged on detection of an immediate input signal to cause the input signals to be transferred to said temporary data store for presentation to the output.

5. Input signal handling apparatus according to claim 4 wherein input signals presented at the output by the temporary data store are passed to the data store and said data store is arranged to erase only such input signals as have been presented at the output.

* * * * *